Dec. 25, 1956     H. J. LAIMING     2,775,127
SHAFT POSITIONING DEVICE
Filed Nov. 25, 1952     2 Sheets-Sheet 1

INVENTOR

HARRY J. LAIMING

By

*J.R.Heintzen*

ATTORNEYS

Dec. 25, 1956     H. J. LAIMING     2,775,127
SHAFT POSITIONING DEVICE
Filed Nov. 25, 1952                                2 Sheets-Sheet 2

INVENTOR

HARRY J. LAIMING

By

*H.C. Heintzen*
ATTORNEYS

United States Patent Office 2,775,127
Patented Dec. 25, 1956

2,775,127

SHAFT POSITIONING DEVICE

Harry J. Laiming, Springfield, Pa., assignor, by mesne assignments, to the United States of America as represented by the Secretary of the Navy Application November 25, 1952, Serial No. 322,425

5 Claims. (Cl. 74—10.29)

This invention relates to shaft positioning devices and more especially to such devices which position the shaft sequentially to a plurality of angles of rotation thereof.

It is at times desirable to shift the wave length at which electronic transmitters or receivers are operating through a predetermined series of wave lengths. This may conveniently be done by securing one element of a tuning device, such as a variable condenser, to a rotatable shaft and then rotating the shaft to the desired angle. This invention provides a device for automatically rotating such shafts.

It is accordingly an object of this invention to provide novel apparatus for rotating a shaft to a predetermined series of angles of rotation.

It is another object of this invention to provide a shaft rotating apparatus which is actuated by a simple movement.

It is a further object of the invention to provide electronic tuning elements which are rugged and precise.

Other objects and many of the attendant advantages of this invention will be readily appreciated as the same becomes better understood by reference to the following detailed description when considered in connection with the accompanying sheets of drawings wherein.

Figures 1, 2:
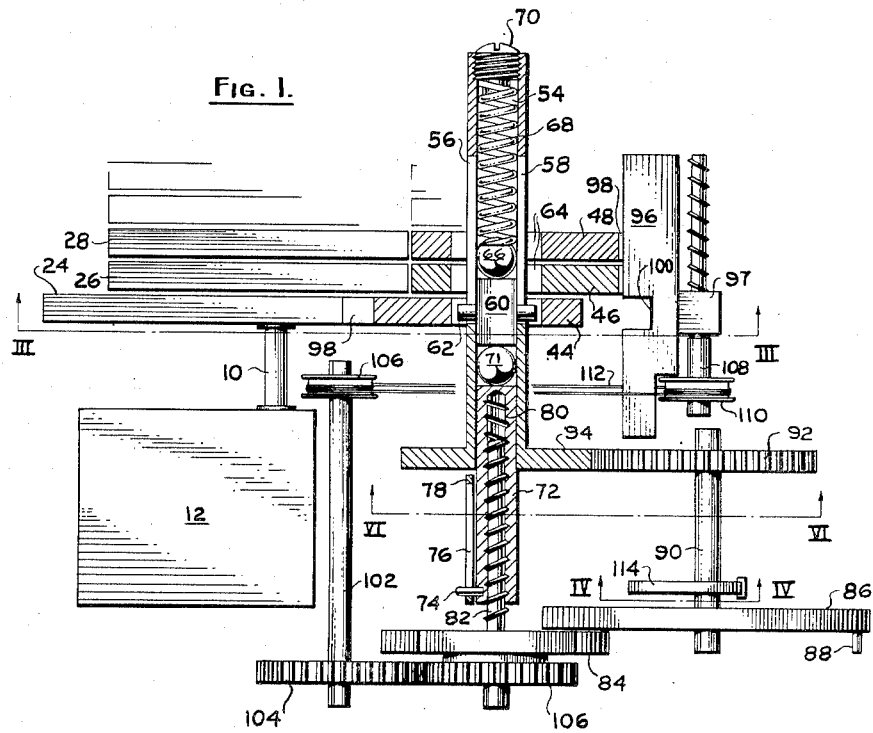
Fig. 1 is a plan view partly in section of the shaft positioning device of this invention.
Fig. 2 is an elevation of the device of Fig. 1.

Referring now to the various figures, the reference numeral 10 designates a shaft journaled for rotation in the casing 12 which houses an electronic tuning device (not shown) for shifting wave lengths. A plurality of identical cams 14, 16, and 18 are frictionally secured to the shaft 10 at different angles of rotation. The cams 14, 16 and 18 and the shaft 10 rotate as a unit. While only three cams 14, 16 and 18 are shown in the drawings, it is to be understood that any number of such cams may be secured to the shaft. Each of the cams 14, 16, and 18 has an indexing projection 20 and a skirt portion 22 having a flat surface 23.

Figure 3:
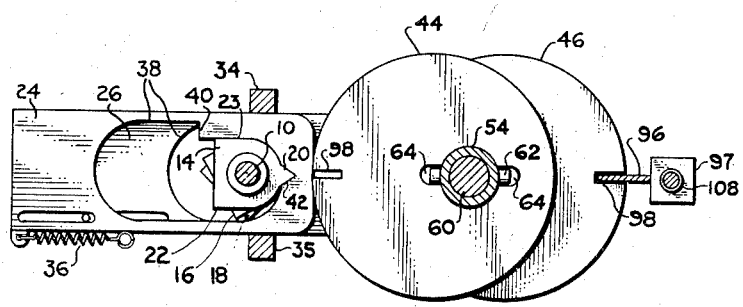
Fig. 3 is a sectional view on the line III—III of Fig. 1, but with guides for the actuating plates added.
Figure 4:
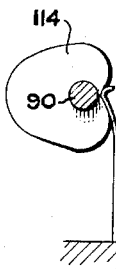
Fig. 4 is a sectional view on the line IV—IV of Fig. 1.
Figure 5:
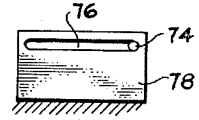
Fig. 5 is an elevation of the slide and pin of the key actuating plunger.

A series of actuating plates 24, 26, and 28 are adapted for sliding movements in guides 34 and 35 in a direction at right angles to the shaft 10. Each of the actuating plates 24, 26, and 28 is biased to the right as viewed in Fig. 3 by a spring 36. Each of the actuating plates 24, 26, and 28 has an opening in which one of the cams 14, 16, and 18 is located, the cam 14, for example, being located in the opening 38 of plate 24. Each of the openings 38 is also formed to provide a shoulder 40 which engages the flat surface 23 of the skirt portion 22 of its respective cam 14, 16, or 18 to rotate the cam and the shaft 10 when the actuating plate associated therewith slides to the left as viewed in Fig. 3 provided the cam is in position for such engagement.

Each of the openings 38 also provides an indentation 42 adapted to engage the indexing projection 20 of one of the cams 14, 16, or 18 to accurately position the respective cam and the shaft 10. Fig. 3 shows the indexing projection 20 of cam 14 so engaged. When the shaft 10 has been thus rotated by the interaction of a plate and a cam, the electronic tuning elements (not shown) in the casing 12 will be rotated to effect a change in the tuning of the electronic apparatus. The structure of the cams 14, 16, and 18 and of the actuating plates 24, 26, and 28 is more fully described and claimed in the United States patent application, Serial Number 295,637, filed June 26, 1952 by the inventor of this invention.

The plates 24, 26 and 28 are moved by eccentric cams 44, 46, and 48 respectively. Each of the eccentric cams 44, 46, and 48 are journaled for rotation on a hollow shaft 54. The hollow shaft 54 is provided with two longitudinal and oppositely disposed slots 56 and 58. A cylinder 60 is located in the hollow shaft 54 to slide therein. A pin 62 pierces the cylinder 60 and projects outwardly through the slots 56 and 58. Each of the eccentric cams 44, 46, and 48 is provided with two oppositely disposed slots 64 at their journal bearing which slots 64 are adapted to receive the pin 62. The pin 62 acts as a key and is adapted to engage the slots 64 of any one of the eccentric cams 44, 46, or 48, to key said eccentric cam to the hollow shaft 54 to rotate therewith.

The cylinder 60 is biased downwardly as viewed in Fig. 1 by a ball bearing 66 engaged by one end of a compression spring 68. The other end of the compression spring 68 engages a plug 70 which is screw threadedly engaged in the end of the shaft 54. The cylinder 60 is positioned in the hollow shaft 54 against the biasing action of the spring 68 by a ball bearing 71 and a plunger 72 located partially in the hollow shaft 54. A pin 74 in the portion of the plunger 72 which projects from the shaft 54 engages a slot 76 in a stationary plate 78 to prevent the plunger 72 from rotating.

The plunger 72 has an internally threaded bore 80 which engages with the threads of a shaft 82 journaled by means not shown for rotation only and secured at one end to a slotted Geneva disk 84. The Geneva disk 84 cooperates with a second disk 86 which carries the pin 88 near its perimeter. The disk 86 is fixedly secured to an actuating shaft 90 which is journaled by means not shown for rotation only. When the disk 86 rotates, the pin 88 engages the slots of the Geneva disk 84 to provide intermittent motion to the shaft 82. The intermittent motion of the Geneva disk 84 caused by each revolution of the disk 86 rotates the shaft 82 to move the pin 62 of the cylinder 60 sequentially from the center of one of the eccentric cams 44, 46, or 48 to the center of an adjacent eccentric cam.

A gear segment 92 is secured to the actuating shaft 90 to rotate therewith. The gear segment 92 engages a gear wheel 94 fixedly secured to the hollow shaft 54.

Figure 6:
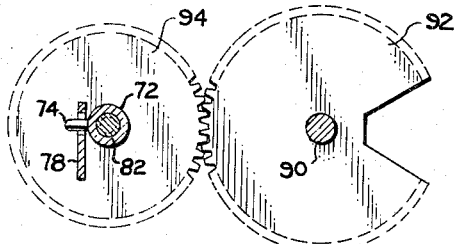
Fig. 6 is a sectional view on the line VI—VI of Fig. 1.

When the actuating shaft 90 is rotated clockwise approximately 150° from its position shown in Figs. 2 and 6, cam 44 will rotate through an angle of 180° allowing the actuating plate 24 to be moved to the right as viewed in Fig. 1 by the spring 36. The position of the shaft 10 will not be changed during this period. On further rotation of the actuating shaft 90 through about 60°, the Geneva wheel 84 will be actuated by the pin 88 to rotate the shaft 82 and move the pin 62 from the center of the eccentric cam 44 to the center of the eccentric cam 46. Further rotation of the actuating shaft 90 through about 150° will turn the hollow shaft 54 and the eccentric cam 46 engaged by the pin 62 through an angle of 180° to move the actuating plate 26 to the left as viewed in Fig. 1. Thus every revloution of the shaft 90 retracts one of the plates 24, 26, or 28 and projects a plate adjacent to the retracted plate.

Additional apparatus is provided to hold those eccentric cams 44, 46, or 48 which are not engaged by the pin 62 in a fixed position. This apparatus comprises a plate 96 which is adapted to engage slots 98 formed in the eccentric cams 44, 46, and 48. The plate 96 is provided with a notch 100 to release one of the eccentric cams 44, 46, or 48 and is arranged to slide in guides not shown, in a direction parallel to the hollow shaft 54 and in such a manner that the notch 100 is maintained directly opposite the pin 62. The eccentric cam 44, 46, or 48 which is engaged by the pin 62 will accordingly be released from the holding plate 96.

The mechanism for moving the plate 96 in synchronism with the pin 62 comprises a shaft 102 journaled by means not shown for rotary motion only. A gear wheel 104 affixed to the shaft 102 engages a second gear wheel 106 identical to the gear wheel 104 and secured to the shaft 82. A pulley 106 is affixed to shaft 102. A shaft 108 is journaled by means not shown for rotation only and is screw threadedly engaged with a projection 97 on the plate 96 to move the same in a direction parallel to the shaft 54. A pulley 110, identical with the pulley 106, is affixed to the shaft 108. An endless cord 112 engages and is wrapped around each of the pulleys 106 and 110 to impart the movements of the pulley 106 to the pulley 110. The screw threads of the shaft 108 are of the same pitch as the screw threads on the shaft 82 so that the plate 96 is at all times advanced by the same distance that the pin 62 is advanced.

A heart-shaped cam 114 is affixed to the shaft 90 and is provided with a spring bias which tends to retain the shaft 90 in the position shown in Fig. 1. This serves as an indication to the person rotating the shaft 90 that a complete cycle of the device has been completed. It also serves to hold the device in a fixed position when the cycle of operation is completed.

*Operation*

Assume that the apparatus is in the position shown in the drawings and that the time has arrived at which a change to the next preselected wave length must be made. This change is effected by merely rotating the actuating shaft 90 through one revolution in the clockwise direction as viewed in Fig. 2. This may be done manually by the operator or by means of a knob (not shown) secured to the shaft 90 or by a time controlled device. If done manually, the resistance to rotation beyond 360°, which resistance is effected by the spring bias on the cam 114, indicates to the operator that the revolution has been completed.

The first portion of the revolution of the actuating shaft 90 allows one of the springs 36 to move the actuating plate 24 to the right as viewed in Fig. 1, thereby releasing the cam 14.

The next portion of the revolution of the actuating shaft 90 moves the pin 62 from its engagement with the eccentric cam 44 into engagement with the eccentric cam 46 and moves the plate 96 upward, as viewed in Fig. 1, to release the eccentric cam 46 and lock the eccentric cam 44.

The final portion of the revolution of the actuating shaft 90 rotates the eccentric cam 46 through 180°, causing it to move the actuating plate 26 to the left, as viewed in Fig. 1, which movement causes the cam 16 and the shaft 10 to be rotated to a new angle, thus changing the wave length of the apparatus.

To prepare the apparatus to effect a series of wave length shifts is the work of a mechanic who returns the cylinder 60 and the shaft 10 to their starting positions and sets the cams 14, 16, and 18 in such relative positions on the shaft 10 that the desired sequence of predetermined wave lengths is effected by the apparatus.

It will be apparent from the above that a series of tuning positions is effected in the shaft 10 when the shaft 90 is rotated through a series of cycles.

Obviously many modifications and variations of the present invention are possible in the light of the above teachings. It is therefore to be understood that within the scope of the appended claims the invention may be practiced otherwise than as specifically described.

What is claimed is:

1. In a shaft positioning device the combination of a shaft to be positioned; a plurality of mechanisms associated with said shaft, each of said mechanisms being adapted, when actuated, for rotating said shaft to an angular position, said position being determined by the respective mechanism actuated; a cam associated with each of said mechanisms to actuate the same when said cam is rotated; and means for sequentially rotating said cams, said means comprising a hollow shaft having a longitudinal slot in the wall thereof, each of said cams being journaled upon said hollow shaft and having a slot therein adjacent said hollow shaft, a key projecting through the slot of said hollow shaft and adapted to move longitudinally therein to engage the slot of one of said cams and to secure said one cam to said hollow shaft to rotate therewith, an actuating shaft adapted for rotation, means responsive to a portion of a revolution of said actuating shaft for causing said key to move from said slot of said one cam to the slot of an adjacent cam, and means responsive to another portion of a revolution of said actuating shaft for rotating said hollow shaft.

2. In a shaft positioning device; the combination of a support; a first shaft journaled on said support; a plurality of mechanisms associated with said first shaft, each of said mechanisms being adapted to rotate said first shaft about its longitudinal axis to an angular position with respect to said support when said mechanism is actuated, said angular position being determined by the respective mechanism actuated; and means for actuating said mechanisms in sequence, said means comprising a second shaft, a plurality of cams journaled on said second shaft to rotate freely thereon, each of said cams cooperating with one of said mechanisms to actuate the same when said cam is rotated, and a device for sequentially securing said cams singly to said second shaft to rotate therewith, said device including a third shaft, said third shaft being operatively connected with said second shaft to rotate said second shaft through one revolution during a first portion of a revolution of said third shaft and to release one of said cams from said second shaft and secure another cam to said second shaft during a second portion of a revolution of said third shaft.

3. The shaft positioning device defined in claim 1 wherein said means for causing said key to move includes a slotted disk of a Geneva motion, said disk being operatively connected to said key, and a pin for moving said disk, said pin being secured to said actuating shaft.

4. The shaft positioning device defined in claim 1 wherein said means for rotating said hollow shaft comprises a gear wheel secured to said hollow shaft and a gear segment secured to said actuating shaft, said gear segment being adapted to intermesh with said gear wheel.

5. The shaft positioning device defined in claim 1, including retaining means adapted to secure at least some of said cams in a fixed position with respect to said mechanisms, and means for moving said retaining means in synchronism with the longitudinal movement of said key in said hollow shaft, said retaining means being adapted to release the cam engaged by said key.

References Cited in the file of this patent

UNITED STATES PATENTS

| | | |
|---|---|---|
| 2,214,506 | Manning et al. | Sept. 10, 1940 |
| 2,214,785 | Wells | Sept. 17, 1940 |
| 2,259,051 | Tyzzer | Oct. 14, 1941 |
| 2,627,957 | May | Feb. 10, 1953 |